May 9, 1950        R. W. RIX        2,507,457
FISHING REEL
Filed Nov. 3, 1947        2 Sheets-Sheet 1
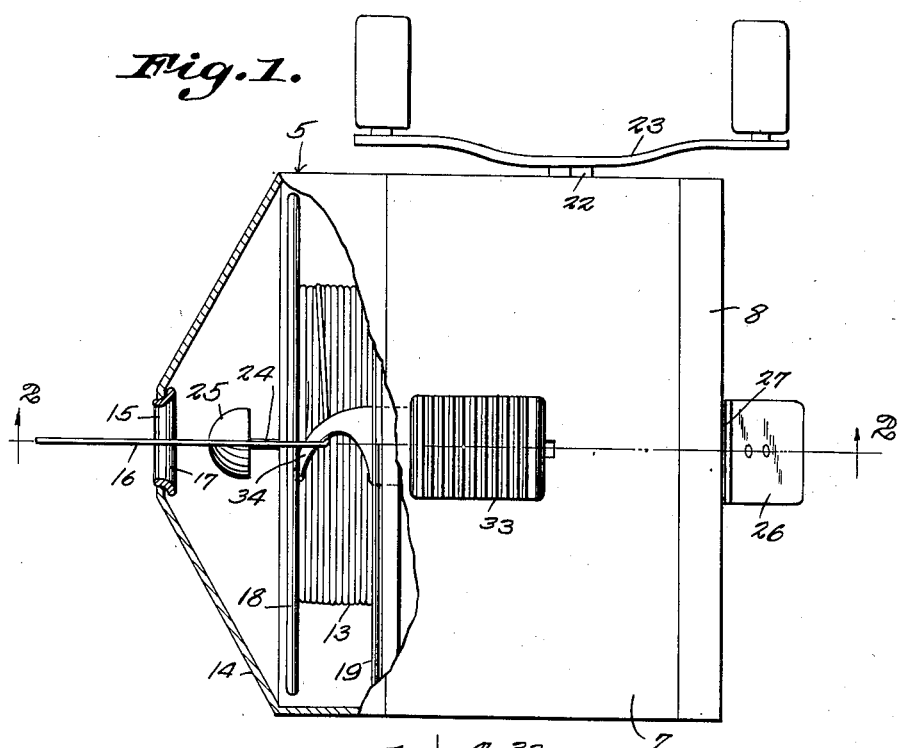
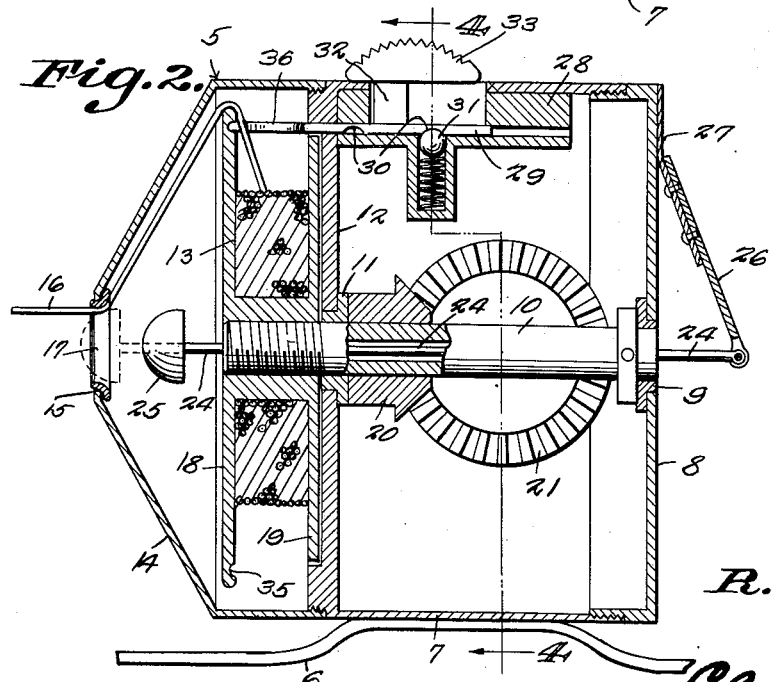
R. W. Rix
INVENTOR
BY *CA Snow & co.*
ATTORNEYS.

May 9, 1950     R. W. RIX     2,507,457
FISHING REEL

Filed Nov. 3, 1947     2 Sheets-Sheet 2

R. W. Rix
INVENTOR

Patented May 9, 1950

2,507,457

UNITED STATES PATENT OFFICE 2,507,457

FISHING REEL

Robert W. Rix, Denver, Colo.

Application November 3, 1947, Serial No. 783,639

2 Claims. (Cl. 242—84.5)

This invention relates to fishing line reels, and aims to provide novel means whereby the movement of the line from the reel may be retarded or prevented, by the actuation of a movable braking member designed to frictionally engage the fishing line passing from the reel.

With the foregoing and other objects in view which will appear as the description proceeds, the invention consists of certain novel details of construction and combinations of parts hereinafter more fully described and pointed out in the claims, it being understood that changes may be made in the construction and arrangement of parts without departing from the spirit of the invention as claimed.

Referring to the drawings:

Figure 1 is a plan view of a fishing reel constructed in accordance with the invention.

Fig. 2 is a sectional view taken on line 2—2 of Fig. 1.

Figure 3:
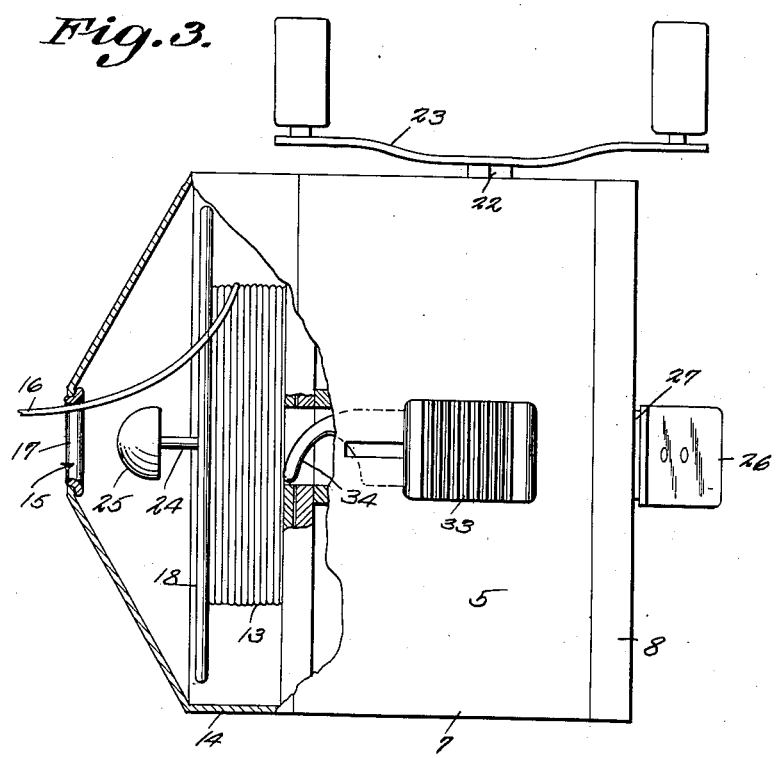
Fig. 3 is a plan view illustrating the position of the guide member when the line is fed from the reel.
Figure 4:
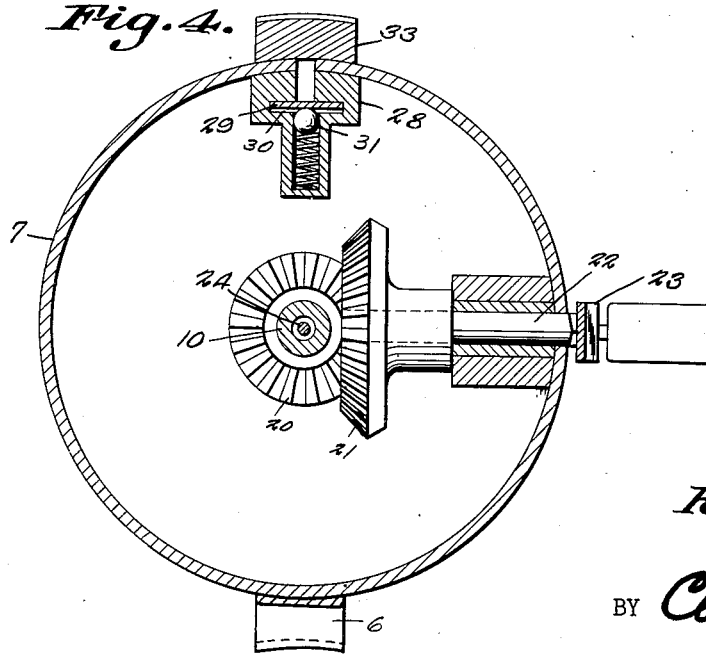
Fig. 4 is a sectional view taken on line 4—4 of Fig. 2.

Referring to the drawings in detail, the reference character 5 indicates the housing in which the spool is mounted, the housing being provided with the usual tang 6, by means of which the reel housing is secured to the casting rod.

The housing comprises a main section 7, which is closed at one end by means of the threaded closure 8 which carries the bearing 9, in which one end of the main shaft 10 operates, the main shaft also operating in the bearing 11, mounted within the end wall 12 of the housing. As shown, the shaft 10 is hollow and extends beyond the end wall 12 where it is threaded to accommodate the spool 13 which is secured to the shaft 10 to rotate therewith.

A cover 14 is threaded on the end wall 12 and protects the spool and line wound thereon. This cover 14 is formed with an opening 15 through which the line 16 wound on the spool 13 extends, the line running over the hardened or chrome-plated bushing 17.

As clearly shown by Fig. 2 of the drawings, the forward side 18 of the spool is of a diameter greater than the inner side 19 thereof, the forward side 18 being spaced from the cover 14 to provide a clearance through which the line 16 extends, as the line is being removed from the spool during casting. It might be stated that during casting the spool is held stationary by the person using the reel.

Secured to the shaft 10 is the gear 20 which is in mesh with the gear 21, that in turn is mounted on the operating shaft 22, which extends through an opening in the housing, where the operating handle 23 is connected thereto. Thus, it will be seen that by operating the handle 23, the gears will rotate the shaft to wind or reel the fishing line 16 on the spool 13.

Extending through the hollow shaft 10 is the brake rod 24, to the forward end of which is secured the plastic head 25 which is shaped to fit within the bushing and engage the line 16 moving therewith, setting up a binding action with the line to hold the line against movement.

One end of the rod 24 is connected to the arm 26 that is secured to one end of the flat spring 27, the action of the spring being to normally urge the arm 26 outwardly or to the position as shown in full ines in Fig. 2. Thus it will be seen that when it is desired to hold the line 16 against movement during fishing, the operator may by pressing the arm 26, operate the brake holding the line.

Secured within the housing is the bearing block 28 which is formed with a slot in which the guide member 29 operates, the guide member 29 having recesses 30 formed in the under surface thereof, which recesses receive the spring pressed ball 31, which locks the guide member 29 in either its active or inactive position.

A slot is formed in the top of the housing 5, through which the arm 32 extends, the arm 32 being connected with the guide member 29 and with the thumb piece 33, whereupon the guide member may be moved longitudinally of the slot of the bearing block to extend the guide finger 34 thereof to a position directly over the line wound on the spool, as shown by Fig. 2 of the drawings, or to the inactive position as shown by Fig. 3 of the drawings.

The guide finger 34 is curved and when in its extended position, rests within the annular groove 35 formed in the inner surface of the forward side 18 of the spool 13. This guide finger provides a guide over which the line 16 moves when the line is being wound on the spool in retrieving.

From the foregoing it will be seen that due to the construction shown and described, I have provided a fishing line reel including a spool wherein the axis thereof is parallel to the casting rod on which it is supported, the spool rotating at right angles to the axis of the spool. Thus it will be seen that the line may be unwound from the spool by feeding the line over one edge of the reel, the reel remaining stationary, eliminating backlash.

When it is desired to retrieve the line the guide finger will be extended, the line moving over the guide finger where the line is accurately fed or wound on the spool.

From the foregoing it is believed that due to the construction shown and described the construction and operation of the spool will be apparent, and that further description is unnecessary.

Having thus described the invention, what is claimed is:

1. A fishing line reel for mounting on a casting rod, comprising a housing, a spool shaft extending longitudinally of the housing in parallel relation with the casting rod, a spool mounted on one end of the shaft and operating at right angles to the shaft, said spool having an annular groove in one side thereof, a guide member mounted within the housing including a finger moving in a line parallel to the shaft, one end of the guide finger moving into the groove guarding the end of the guide finger, said guide finger providing a guide for the line wound on the spool, and means for rotating the shaft.

2. A fishing line reel for mounting on a casting rod, comprising a housing having an opening through which a fishing line is fed, a hollow shaft mounted within the housing, a spool secured to the shaft and from which a fishing line is delivered through the opening of the housing, a brake including a rod extended through the hollow shaft, a head on one end of the rod for engagement with the line passing through the opening of the housing, holding the line against movement, and means for rotating the shaft and spool.

ROBERT W. RIX.

REFERENCES CITED

The following references are of record in the file of this patent:

UNITED STATES PATENTS

| Number | Name | Date |
|---|---|---|
| 2,179,413 | Kolosso | Nov. 7, 1939 |
| 2,299,156 | Lind | Oct. 20, 1942 |

FOREIGN PATENTS

| Number | Country | Date |
|---|---|---|
| 383,423 | Great Britain | Nov. 17, 1932 |